US005272788A

United States Patent [19]

Gilstrap

[11] Patent Number: 5,272,788

[45] Date of Patent: Dec. 28, 1993

[54] INTERCHANGEABLE TOOLS AND HANDLE

[76] Inventor: Cecil G. Gilstrap, P.O. Box 2507, Big Spring, Tex. 79721

[21] Appl. No.: 917,229

[22] Filed: Jul. 23, 1992

[51] Int. Cl.[5] ........................ A47B 95/02; A47J 45/10; B65D 25/28; B25G 3/00

[52] U.S. Cl. .................................... 16/114 R; 403/21; 403/22; 403/356; 403/343

[58] Field of Search ................. 16/114 R; 403/21, 22, 403/356, 343

[56] References Cited

U.S. PATENT DOCUMENTS 1,229,843 6/1917 Whitaker ............................ 403/343
1,530,225 3/1925 Belakoy .............................. 403/365
3,619,009 11/1971 O'Leary ........................... 16/114 R
4,092,080 5/1978 Bradley, Jr. ........................ 403/356

*Primary Examiner*—Lowell A. Larson
*Assistant Examiner*—Carmine Cuda
*Attorney, Agent, or Firm*—John B. Dickman, III

[57] ABSTRACT

An interchangeable handle and utility tool head system where different tool heads are used with the handle. The different tool heads have similar shanks with a screw threaded end. The handle has a female coupling on one end to receive the screw threaded shank. A positive securing device prevents rotation of the tool head relative to the handle where a keyway and key system prevents the rotation.

3 Claims, 2 Drawing Sheets

INTERCHANGEABLE TOOLS AND HANDLE

BACKGROUND OF THE INVENTION

The present invention rotates to an interchangeable handle for use with a variety of utility tools, and in particular to an interchangeable handle which locks utility tools against inadvertent movement.

Prior art interchangeable handles commonly used a handle with a sleeve having a thread female aperture, and a utility tool with a male arm which screw threads into the female aperture. Generally, a locknut is threaded on the male arm where after the male arm is screw threaded into the female aperture the locknut is tightened against the sleeve to prevent the utility tool from coming loose.

It has been realized that having one interchangeable handle for use with several utility tools provide an organized and manageable system for storing many utility tool heads and a single handle in a small area. Whereas conventional tools with individual handles for each tool occupy a lot of space. The obvious solution is an interchangeable handle, however the prior art handles lack a positive means to prevent the utility tool from rotating on the handle. The U.S. Pat. Nos. 1,229,843, 1,530,225 and 3,619,009 show utility handles which are screw threaded onto a handle, and U.S. Pat. No. 3,619,009 also shows a locknut to secure the handle to the utility tool. The problem is that the devices shown in the prior patents become loose after a few uses of the utility tool and handle. The screw threaded connection loosens and becomes unstable for continued use without retightening the connection.

The object of the present invention is to overcome the problems of the prior art by providing an interchangeable handle and utility tool system which positively locks the handle and tool together to prevent the tool from rotating about the handle.

SUMMARY OF THE INVENTION

The object of the invention is achieved by using a length of tubular stock which can be either solid or hollow with a sleeve mounted at one end using mechanical fasteners or chemical bonding agents. The sleeve slips over the end of the tubular stock and the tool and handle are in closely fitted engagement with one another. The sleeve has two ends one of which fits on the tubular stock and another which has an aperture for receiving and holding a female threaded coupling. The female coupling is made from a hex-shaped stock with a threaded apreture.

The utility tool heads of the invention include a variety of different heads such as a hoe, shovel, rake, pitch fork, broom, etc. Each of these utility tool heads has a male threaded shank which threads into the female coupling of the sleeve. To provide a positive connection between the handle and the utility tool head there are two grooves cut in the female coupling and the shank of a utility tool. The two grooves are aligned such that a spline can be inserted between the two grooves preventing the shank from rotating relative to the handle. A locknut is threaded on the shank prior to assembling the utility tool head on the handle, therefore once the shank is threaded onto the female coupling of the sleeve and the spline is inserted in the aligned groove the locknut is tightened to secure the entire system together.

DESCRIPTION OF THE INVENTION

Figure 1:
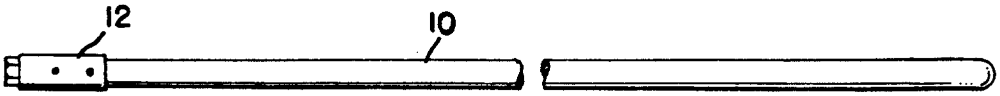
FIG. 1 is a side view of an interchangeable handle of the invention.

Referring to the drawings FIGS. 1-12 there is shown an interchangeable handle and utility tool head system of the invention. In the particular form illustrated a length of tubular stock material, which can either be solid or hollow, forms a handle 10 with a press fitted sleeve 12 mounted by mechanical fasteners 14 and 16, or a chemical bonding agent to the handle. The handle 10 may be wooden, aluminum or fiberglass, plastic and the like.

Figure 2:
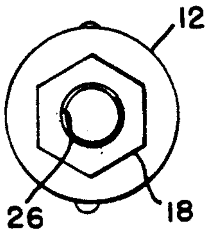
FIG. 2 is a front view of an end of an interchangeable handle taken along the line 2—2 of FIG. 3.
Figure 3:
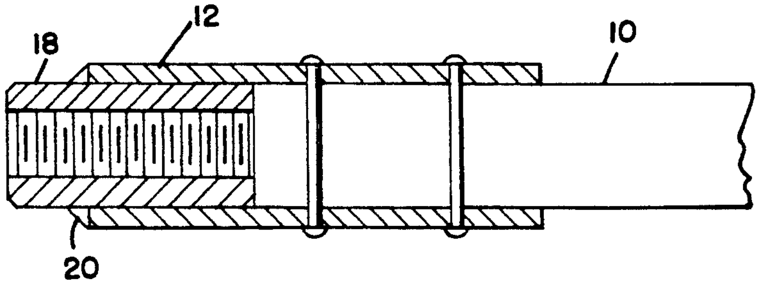
FIG. 3 is a cross section taken along the line 3—3 of FIG. 2.

The sleeve 12 is a metal tube which houses a female coupling 18 that is welded to the sleeve at 20. Exposed portion 22 of sleeve 20 has a hexangular cross section 24 which is best shown in FIG. 2, to receive a wrench as will be explained. There is an aperture 26 with screw threads 28 in female coupling 18.

Figure 4:
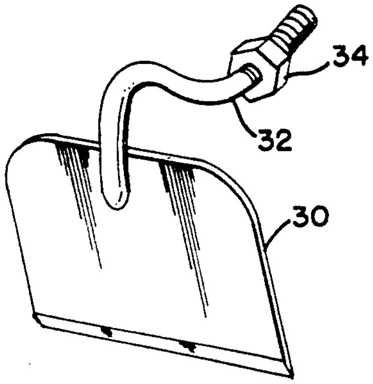
FIGS. 4–7 show utility tool heads for use with an interchangeable handle of the invention.

A plurality of different tool heads are shown in FIGS. 4–7. In FIG. 4, for example, a hoe 30 is shown with a shank 32. The free end of the shank 32 is screw threaded to mate with the threaded aperture 26 of the female coupling. There is a locknut 34 on the threaded shank 32, such that after the shank 32 is screwed into female coupling 18 the locknut 34 is tightened by using a wrench on the locknut and a second wrench on hexangular section 24 of female coupling 18.

Figure 5:
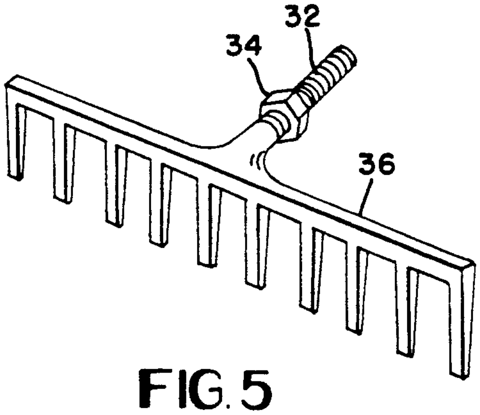
Figure 6:
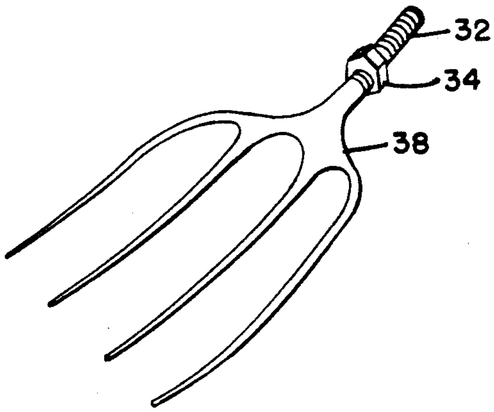
Figure 7:
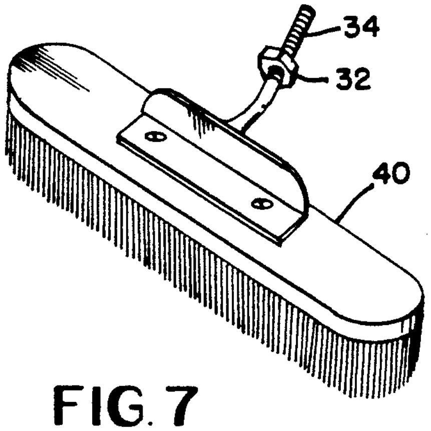

Similar threaded shanks 32 are shown on a rake head 36 in FIG. 5; a pitch fork 38 in FIG. 6, and a broom 40 in FIG. 7.

In each of the applications with one of the tool heads 30, 36, 38 or 40, the use of a locknut to secure the tool head to interchangeable handle 10 is sufficient in many situations. There are situations where twisting motions are applied to the tool head which will cause the locknut 34 to loosen and the tool head to rotate relative to handle 10. In those situations a positive securing means is needed to prevent rotation of a tool head. FIGS. 8–12 show another embodiment of the invention which includes a positive securing means.

Figure 8:
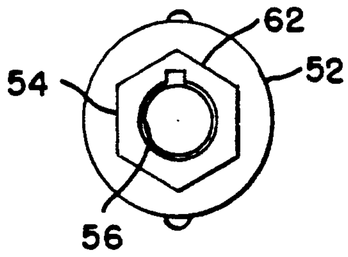
FIG. 8 is an end view of another embodiment of the invention taken along the line 8—8 of FIG. 9.
Figure 9:
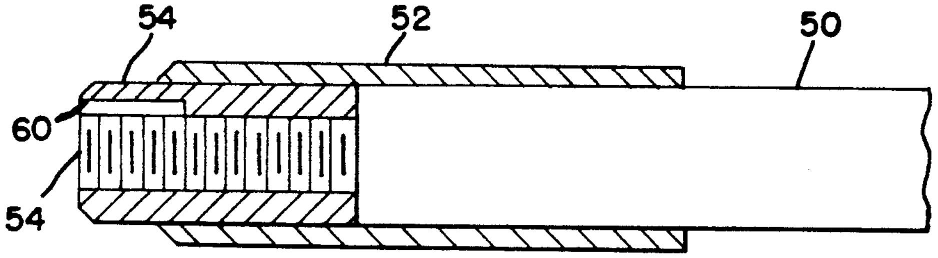
FIG. 9 is a cross section view taken along the line 9—9 of FIG. 8.
Figure 10:
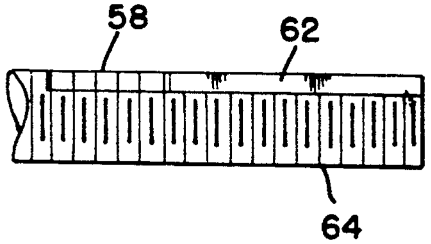
FIG. 10 is a side view of a shank of a utility head of the invention.

Looking at FIGS. 8 and 9, an interchangeable handle 50 is shown with a press fitted sleeve 52 mounted by mechanical fasteners including rivets, nuts and bolts, etc., or chemical bonding agents. As with the handle 10 it may be wooden, aluminum or fiberglass.

Sleeve 52 is a metal tube which houses a female coupling 54 that is permanently fastened to the sleeve either by a mechanical fastener, chemical bonding or welding. The sleeve 52 has an exposed hexangular shape for tightening a tool head shank similar to the shanks of tools 30, 36, 38 and 40, respectively. There is a threaded aperture 56 extending through female coupling 54 to receive the male screw threaded end of a tool head shank 58.

To provide a positive securing means for the interchangeable handle 50 and a utility tool head shank 58, there is a keyway or groove 60 in the threaded aperture 56 of female coupling 54 which aligns with a keyway or groove 62 in a screw threaded, end 64 of shank 58. The keyways 60 and 62 are aligned by screwing the male screw end of shank 58 into female coupling 54. A key or spline 66 is inserted in the open area defined by the keyways to prevent further rotation of the tool head relative to handle 50, shown in FIG. 12.

Figure 11:
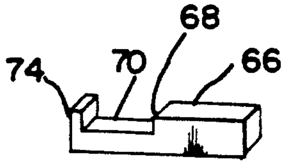
FIG. 11 is a perspective view of a spline of the invention.
Figure 12:
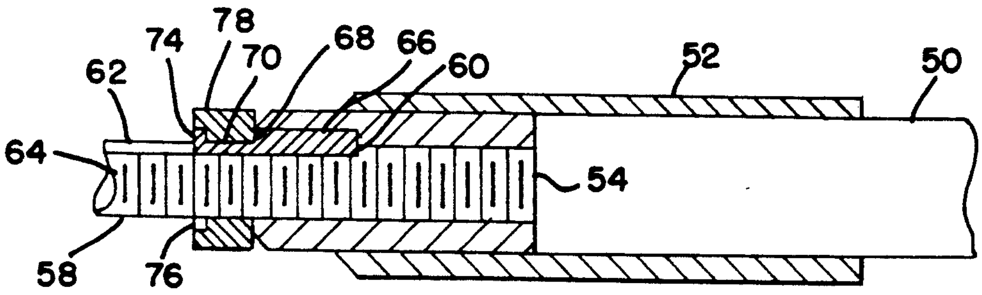
FIG. 12 is a cross section view of the invention.

Key 66, FIG. 11, is constructed to have a raised section 68 which engages both keyways 60 and 62 and a lower projection 70 which fits in keyway 64 without interfering with screw threads 72. At the end of projection 70 is a keeper 74 which engages a groove 76 in surrounding a screw threaded aperture a locknut 78. The purpose of the keeper 74 and groove 76 is to insure that key 66 will travel the length of keyway 64 when locknut 78 is tightened or loosened. In addition the keeper 74 secures the key 66 to locknut 78 and both the key and locknut to shank 58. It is an important feature of key 66 that it does not interfere with the threads of locknut 78 or shank screw threads 72, to accomplish this the height of projection 70 is less than the depth of keyway 62. Further, the distance between raised section 68 and projection 70 is at least the width of locknut 78 to allow free rotation of the locknut on the threaded shank 58.

In use, shank 58 is screwed into female coupling 54 end keyways 60 and 62 are aligned. Locknut 78 is screwed along shank 58, sliding key 66 into the open area of combined keyway 60 and 62. The locknut 78 is wrench tightened to prevent uncoupling of handle 50 and shank 58 of one of the tool heads 30, 36, 38 or 40. To disconnect the tool head, the locknut 78 is loosened to retract the key 66, and the threaded shank 58 is unscrewed from the female connector 54.

While two embodiments of the invention have been disclosed it is to be understood that many variations are possible without departing from the inventive concepts particularly pointed out in the claims.

I claim:

1. An interchangable handle and utility tool head system where several different tool heads are used with the interchangable handle, comprising:

a plurality of different utility tool heads where each tool head has a shank means extending from said tool head, said shank means having screw threads;

a locknut means on said shank means;

a handle means having an elongated shaft with a first end, a sleeve means mounted on said first end of said shaft;

a female coupling integral with said sleeve means, said female coupling having a screw threaded aperture to receive and support said shank means of a utility tool head, where said locknut means secures said shank means to said handle means; and a positive securing means to cooperate with said shank means and said female coupling to prevent rotation of said shank means relative to said handle, having a first keyway in said threaded aperture of said female coupling, a second keyway in said screw threads of said shank means, and a key means for inserting in said first and said second keyways when said keyways are aligned, said key means having a raised section to engage said first and second keyways, a lower projection section having a height less that the depth of said second keyway, and a keeper section of a height greater than the height of said second keyway to engage said locknut.

2. An interchangeable handle and utility tool head system as in claim 1 wherein said locknut is captured between said key means raised section and said keeper section, whereby said locknut has a screw threaded aperture to move on said shank means thereby moving said key means in said second keyway.

3. An interchangeable handle and utility tool head system as in claim 2 wherein said locknut having a groove surrounding said screw threaded aperture to receive said keeper means, whereby the width of said locknut from said groove is equal to the distance between the raised section of said key to said keeper.

* * * * *